(12) United States Patent
Tanaka et al.

(10) Patent No.: US 9,017,887 B2
(45) Date of Patent: Apr. 28, 2015

(54) FUEL CELL SYSTEM AND METHOD OF CONTROLLING THE SAME

(75) Inventors: Hideyuki Tanaka, Aichi-ken (JP); Toru Bisaka, Aichi-ken (JP)

(73) Assignees: Kabushiki Kaisha Toyota Jidoshokki, Aichi (JP); Toyota Jidosha Kabushiki Kaisha, Aichi (JP)

( * ) Notice: Subject to any disclaimer, the term of this patent is extended or adjusted under 35 U.S.C. 154(b) by 1022 days.

(21) Appl. No.: 12/883,213

(22) Filed: Sep. 16, 2010

(65) Prior Publication Data

US 2011/0070508 A1 Mar. 24, 2011

(30) Foreign Application Priority Data

Sep. 18, 2009 (JP) ................. P2009-216408

(51) Int. Cl.
*H01M 8/04* (2006.01)
(52) U.S. Cl.
CPC ...... *H01M 8/04701* (2013.01); *H01M 8/04067* (2013.01); *H01M 8/04089* (2013.01); *H01M 8/04231* (2013.01); *Y02E 60/50* (2013.01)
(58) Field of Classification Search
USPC .......... 429/415, 428–429, 433–438, 443–446
See application file for complete search history.

(56) References Cited

U.S. PATENT DOCUMENTS

| 7,402,352 B2 | 7/2008 | Kamihara et al. | |
| 2004/0115488 A1* | 6/2004 | Sanagi et al. | 429/12 |
| 2006/0035121 A1* | 2/2006 | Yokoi | 429/24 |
| 2008/0038602 A1* | 2/2008 | Yu et al. | 429/22 |
| 2008/0176116 A1* | 7/2008 | Hayashi et al. | 429/14 |

FOREIGN PATENT DOCUMENTS

| JP | 2003-331889 A | 11/2003 |
| JP | 2006-099989 A | 4/2006 |
| JP | 2006-331899 A | 12/2006 |
| JP | 2008-235205 A | 10/2008 |

OTHER PUBLICATIONS

English Machine Translation of JP 2008-235205 (Oct. 2008).*
Machine Translation of JP 2006-331899 (Dec. 2006).*

* cited by examiner

*Primary Examiner* — Jonathan Crepeau
*Assistant Examiner* — Jacob Buchanan
(74) *Attorney, Agent, or Firm* — Sughrue Mion, PLLC

(57) ABSTRACT

A fuel cell system includes an exhaust pipe through which anode purge gas is discharged into the atmosphere, a heat medium passage through which heat medium is flowed, a circulation pump for circulating the heat medium through the heat medium passage, a heat exchanger provided in the heat medium passage, a heat exchanger fan for generating airflow through the heat exchanger, and a guide by which the airflow is guided so as to diffuse the anode purge gas. The circulation pump and the heat exchanger fan are operated during anode purge in such a way that the heat exchanger fan is operated regardless of the heat medium temperature, and a flow rate of the heat medium flowing through the heat medium passage is zero or lower than a flow rate when output of a fuel cell is maximum.

4 Claims, 5 Drawing Sheets

FUEL CELL SYSTEM AND METHOD OF CONTROLLING THE SAME

BACKGROUND OF THE INVENTION

The present invention relates to a fuel cell system, and more particularly to a fuel cell system and method of controlling the same that allows a reduced hydrogen concentration in anode purge gas discharged during anode purge at the start of the fuel cell system.

As a power source that helps to prevent global warming due to exhaust gas, there has been developed a fuel cell that produces electric energy through a chemical reaction between hydrogen and oxygen. In a system with a fuel cell, generally, the cathode is not directly supplied with oxygen but supplied with air containing oxygen. In such fuel cell system, part of the water produced in the cathode and part of the nitrogen contained in the air supplied to the cathode are diffused back through the electrolyte membrane from cathode to anode. Thus, when the fuel cell is started after an interval of time in hours or days, or when the fuel cell is continued to operate, the concentration of hydrogen as anode gas may be decreased relatively due to the increased concentration of water and nitrogen in the anode, which may result in reduced efficiency of electric power generation. To prevent this, generally, purging of the anode (hereinafter referred to as anode purge) is carried out by discharging water and nitrogen in the anode with hydrogen as anode gas. In such anode purge, anode purge gas is diluted with cathode off-gas or using a diluter before being discharged into the atmosphere so that hydrogen concentration in the anode purge gas is decreased to a safe level.

In a conventional fuel sell system disclosed in Japanese Unexamined Patent Application Publication No. 2006-99989, a hydrogen exhaust passage, a hydrogen purge valve and a hydrogen dilution fan are provided on the anode outlet side. In the anode purge when the fuel cell is started or stopped, the hydrogen purge valve is intermittently opened for a short time, and the hydrogen dilution fan is operated depending on the hydrogen concentration in the anode purge gas discharged from the hydrogen exhaust passage so as to diffuse and dilute the anode purge gas with air. As a result, the hydrogen concentration in the anode purge gas is decreased below a predetermined level.

In another conventional fuel cell system disclosed in Japanese Unexamined Patent Application Publication No. 2008-235205, anode purge gas is discharged into the atmosphere through a diluter and an exhaust pipe provided on the anode outlet side. The diluter is connected to a cathode off-gas passage through which cathode off-gas (air) is supplied to the diluter. The fuel cell system further includes a heat medium passage through which cooling water for maintaining the fuel cell at an appropriate temperature is circulated, a radiator provided in the heat medium passage, and a radiator fan for blowing air through the radiator. Airflow generated by the radiator fan is delivered to a position adjacent to the outlet of the exhaust pipe. Thus, the airflow from the radiator fan forces the anode purge gas diluted with the cathode off-gas and discharged from the exhaust pipe into the atmosphere to be diffused, resulting in reduction of hydrogen concentration in the anode purge gas below a predetermined level.

In the fuel cell system disclosed in the publication No. 2006-99989, however, the hydrogen dilution fan additionally provided results in increased size of the system and increased number of parts of the system. On the other hand, in the fuel cell system disclosed in the publication No. 2008-235205, though the use of existing radiator fan helps to prevent increased size of the system and increased number of parts of the system, diffusion of anode purge gas into the atmosphere may not be accomplished sufficiently in the anode purge at the start of the fuel cell. This is because, in general, the radiator fan is started to operate when the cooling water reaches a given temperature and, therefore, the radiator fan is at a stop or operated at a low speed in a condition that only a short time has elapsed after the start of the fuel cell and the amount of heat generated in the fuel cell is still small. In addition, the cathode off-gas (air) for diluting anode purge gas is not supplied sufficiently just after the start of the fuel cell, which may result in insufficient dilution of anode purge gas with the cathode off-gas.

The present invention is directed to providing a fuel cell system that allows hydrogen concentration in anode purge gas to be reduced efficiently and sufficiently during anode purge at a start of the fuel cell system.

SUMMARY OF THE INVENTION

In accordance with an aspect of the present invention, a fuel cell system for generating electric power through a reaction between oxygen supplied to a cathode and hydrogen supplied to an anode of a fuel cell includes an exhaust pipe through which anode purge gas from the fuel cell is discharged into the atmosphere, a heat medium passage through which heat medium is flowed, the heat medium passage being thermally coupled to the fuel cell, a circulation pump for circulating the heat medium through the heat medium passage, a heat exchanger provided in the heat medium passage, a heat exchanger fan for generating airflow through the heat exchanger, a guide by which the airflow is guided so as to diffuse the anode purge gas discharged from the exhaust pipe, and a controller for controlling the operation of the circulation pump and the heat exchanger fan. The circulation pump and the heat exchanger fan are operated under the control of the controller during anode purge for a first time after the start of the fuel cell in such a way that the heat exchanger fan is operated regardless of the heat medium temperature, and a flow rate of the heat medium flowing through the heat medium passage is zero or lower than a flow rate when output of the fuel cell is maximum.

In accordance with another aspect of the present invention, a method of controlling a fuel cell system for generating electric power through a reaction between oxygen supplied to a cathode and hydrogen supplied to an anode of a fuel cell is provided. The fuel cell system includes an exhaust pipe through which anode purge gas from the fuel cell is discharged into the atmosphere, a heat medium passage through which heat medium is flowed, the heat medium passage being thermally coupled to the fuel cell, a circulation pump for circulating the heat medium through the heat medium passage, a heat exchanger provided in the heat medium passage, a heat exchanger fan for generating airflow through the heat exchanger, and a guide by which the airflow is guided so as to diffuse the anode purge gas discharged from the exhaust pipe. The method includes the steps of performing anode purge during a given time after the start of the fuel cell, operating the heat exchanger fan during the anode purge regardless of the heat medium temperature, and operating the circulation pump during the anode purge so that a flow rate of the heat medium flowing through the heat medium passage is zero or lower than a flow rate when output of the fuel cell is maximum.

Other aspects and advantages of the invention will become apparent from the following description, taken in conjunction with the accompanying drawings, illustrating by way of example the principles of the invention.

DETAILED DESCRIPTION OF THE PREFERRED EMBODIMENTS

Figure 1:
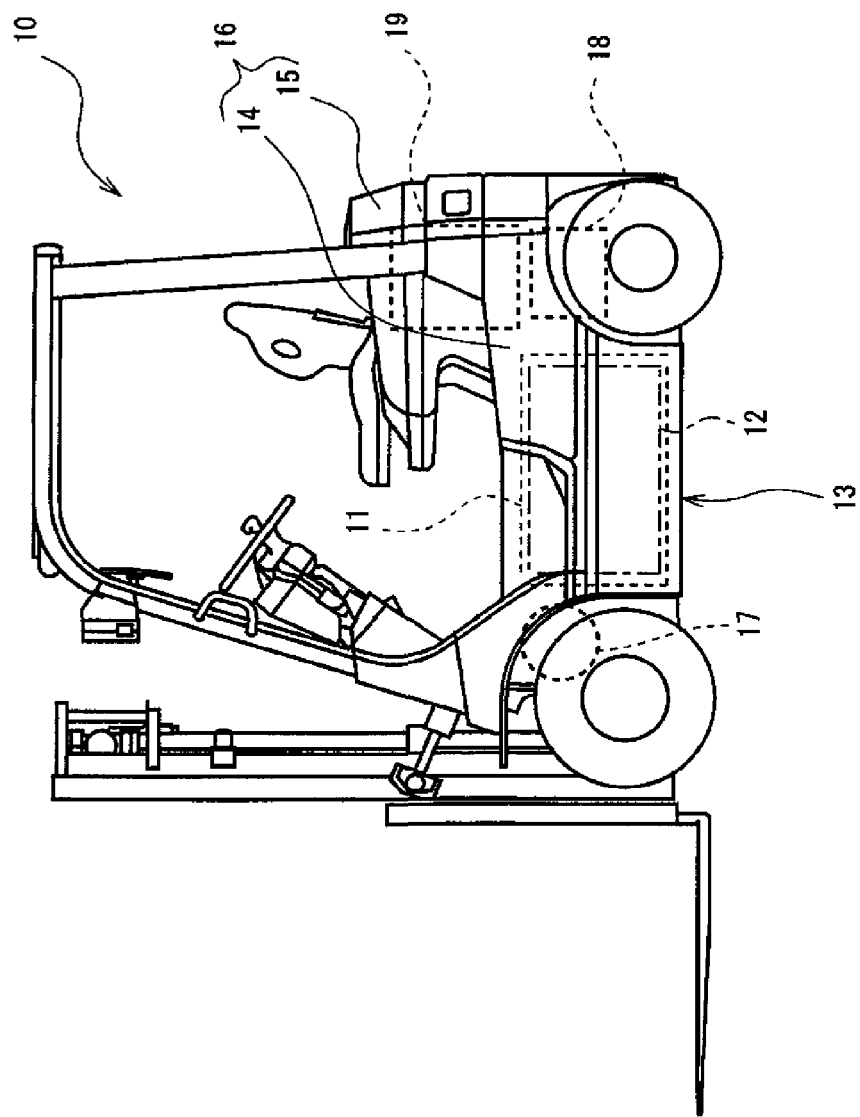
FIG. 1 is a side view of a forklift truck equipped with a fuel cell system according to an embodiment of the present invention.

FIG. 1 shows a fuel cell forklift truck 10 equipped with a fuel cell system 12 according to an embodiment of the present invention. The fuel cell forklift truck 10 is of a battery replacement type in which a lead acid battery as a power source for traveling and loading in a conventional battery forklift truck is replaced by the fuel cell system 12. The existing chassis of the conventional battery forklift truck can be used as the chassis 13 of the fuel cell forklift truck 10 without major modification. Specifically, the truck body 16 formed by the frame 14 and the weight 15, the travel motor 17, the loading motor 18, and the power control unit 19 for controlling the motors 17 and 18 are substantially the same as those of the conventional battery forklift. The fuel cell system 12 is provided in a casing 11 that is mounted on the chassis 13.

Figure 2:
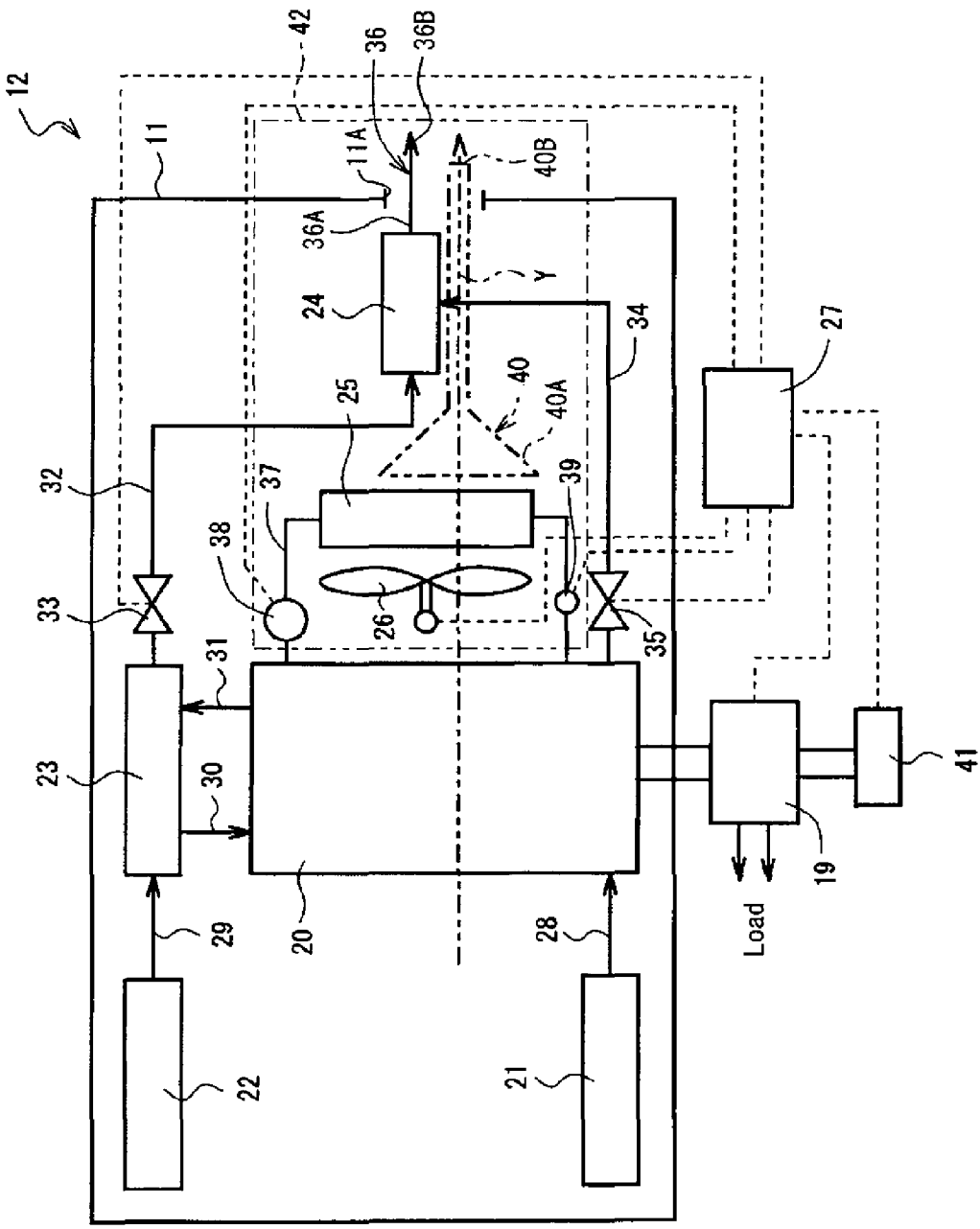
FIG. 2 is a block diagram of the fuel cell system of FIG. 1.

Referring to FIG. 2, the fuel cell system 12 includes a fuel cell 20, a hydrogen tank 21 for supplying hydrogen to the anode of the fuel cell 20, an air compressor 22 for supplying compressed air to the cathode of the fuel cell 20, a humidifier 23 for humidifying compressed air from the air compressor 22, and a diluter 24 for diluting purge gas from the anode of the fuel cell 20. The fuel cell system 12 further includes a radiator 25 (heat exchanger) and a radiator fan 26 (heat exchanger fan) for cooling the fuel cell 20, and a controller 27 (hereinafter referred to as ECU) for controlling the operation of the fuel cell system 12.

The fuel cell 20 is provided for example by a polymer electrolyte fuel cell, generating direct current electric energy (direct current power) by reacting hydrogen supplied from the hydrogen tank 21 with oxygen contained in the air supplied from the air compressor 22. The hydrogen tank 21 as a hydrogen source is connected through a pipe 28 to the hydrogen inlet port (not shown) of the fuel cell 20. The pipe 28 is provided with a pressure-regulating valve (not shown) by which the pressure of hydrogen to be supplied from the hydrogen tank 21 to the fuel cell 20 is reduced to a given level.

The air compressor 22 is connected to the humidifier 23 through a pipe 29. The humidifier 23 is connected to the oxygen inlet port of the fuel cell 20 (not shown) through a pipe 30 and to the off-gas outlet port (not shown) of the fuel cell 20 through a pipe 31. Compressed air from the air compressor 22 is humidified in the humidifier 23 and then supplied through the pipe 30 to the oxygen inlet port of the fuel cell 20. Off-gas from the cathode of the fuel cell 20 is discharged through the pipe 31 into the humidifier 23.

The humidifier 23 is connected to an exhaust pipe 32 through which cathode off-gas of the fuel cell 20 is discharged. The exhaust pipe 32 is provided with a pressure-regulating valve 33 and connected at the downstream end thereof to the diluter 24 as viewed in the direction of cathode off-gas flow. The fuel cell 20 has a hydrogen outlet port (not shown) to which one end of a purge gas pipe 34 is connected. The other end of the purge gas pipe 34 is connected to the diluter 24. The purge gas pipe 34 is provided with a purge valve 35.

The fuel cell system 12 further includes an exhaust pipe 36 one end 36A of which is connected to the diluter 24. The exhaust pipe 36 extends through an opening 11A of the casing 11 to the outside of the casing 11 and is opened at the other end 36B to the atmosphere. Anode purge gas discharged from the hydrogen outlet port of the fuel cell 20 is introduced through the purge gas pipe 34 into the diluter 24. Then the anode purge gas is diluted in the diluter 24 with the cathode off-gas from the exhaust pipe 32 and discharged from the exhaust pipe 36 into the atmosphere as exhaust gas.

The fuel cell 20 is connected to a heat medium passage 37 provided with the radiator 25. The heat medium passage 37 is thermally coupled to the fuel cell 20. The heat medium passage 37 is provided with a circulation pump 38 for circulating cooling water (heat medium) through the heat medium passage 37 and the fuel cell 20. The heat medium passage 37 is provided with a temperature sensor 39 for measuring the temperature of cooling water circulating through the heat medium passage 37. The radiator fan 26 is provided between the fuel cell 20 and the radiator 25. The radiator fan 26 produces airflow toward the radiator 25 by drawing outside air, thereby increasing airflow through the radiator 25. In FIG. 2, the symbol Y denotes the airflow generated in the casing 11 by the rotation of the radiator fan 26 and directed from the fuel cell 20 toward the radiator 25 and further toward the other end 36B of the exhaust pipe 36.

There is provided a guide pipe 40 (guide) in the casing 11. Airflow from the radiator fan 26 through the radiator 25 is guided through the guide pipe 40 and directed out of the casing 11. The guide pipe 40 has at one end thereof a tapered portion 40A the diameter of which is gradually increased toward the radiator 25. The guide pipe 40 has at the other end an outlet 40B projecting out of the casing 11 from the opening 11A. The outlet 40B of the guide pipe 40 is located adjacent to the other end 36B of the exhaust pipe 36 so as to diffuse exhaust gas discharged from the exhaust pipe 36. In FIG. 2, the airflow passing through the guide pipe 40 is indicated by arrow Y.

The radiator fan 26, the pressure-regulating valve 33, the purge valve 35, the circulation pump 38 and the temperature sensor 39 are all connected to the ECU 27. The power control unit 19 for converting the electric power generated in the fuel cell 20 into the electric power for a base vehicle is connected to the fuel cell 20. The fuel cell 20 is also connected to a capacitor 41 as an auxiliary power supply for the fuel cell 20 that is used when starting the forklift truck.

Figure 3:
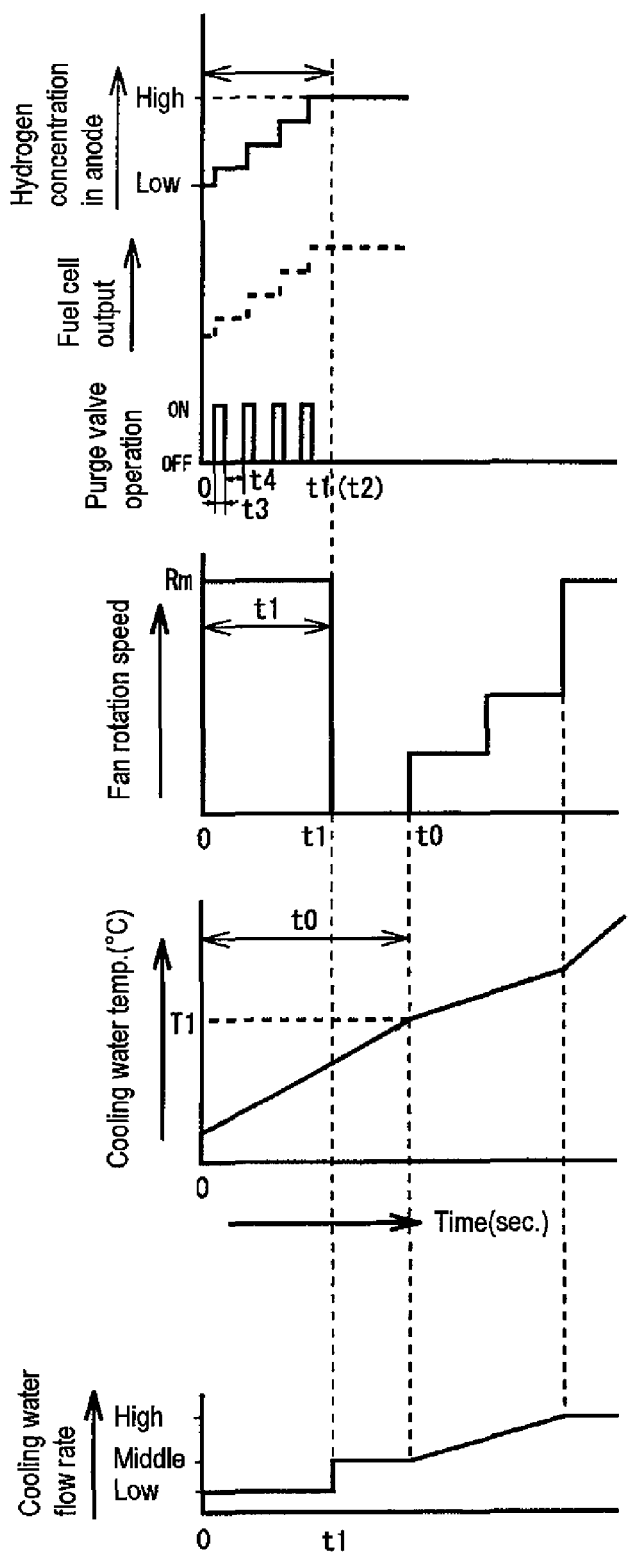
FIG. 3 shows graphs explaining the operation of the fuel cell system of FIGS. 1 and 2.
Figure 4:
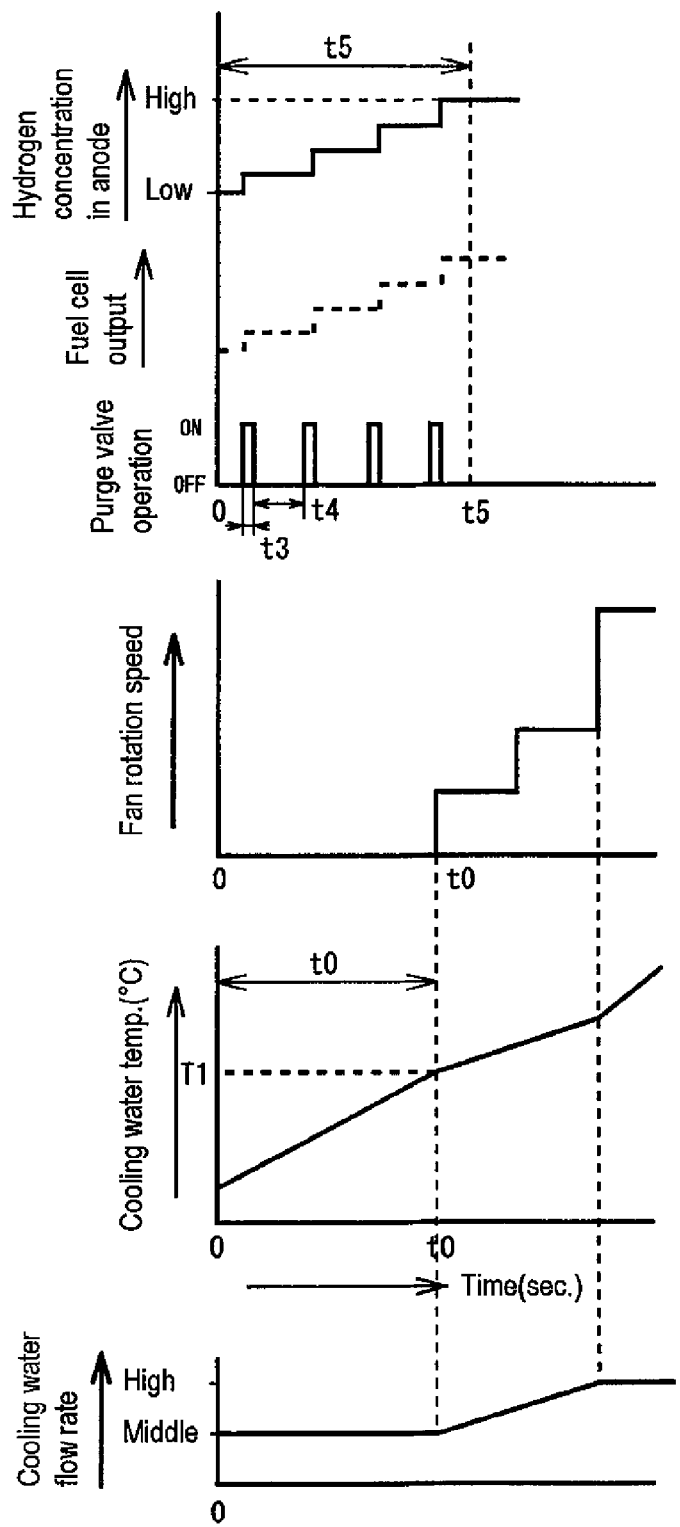
FIG. 4 shows graphs as an example for comparison with the embodiment of the present invention.

The following will describe the operation of the fuel cell system 12 with reference to FIGS. 2 through 4.

While the fuel cell 20 is in operation, hydrogen, the pressure of which has been regulated by the pressure-regulating valve, is supplied from the hydrogen tank 21 through the pipe 28 to the anode of the fuel cell 20. Compressed air supplied from the air compressor 22 to the humidifier 23 is humidified and supplied through the pipe 30 to the cathode of the fuel cell 20. The hydrogen supplied to the anode is decomposed into hydrogen ions and electrons in the presence of a catalyst, and the hydrogen ion moves through the electrolyte membrane to the cathode with water. In the cathode, oxygen in the air is reacted with the hydrogen ion having passed through the electrolyte membrane and the electrons having passed through an external circuit, so that water is produced. The water thus produced in the cathode, which is in the form of a vapor, is discharged with unreacted air through the pipe 31 into the humidifier 23 as cathode off-gas and delivered through the exhaust pipe 32 to the diluter 24.

As shown in FIG. 3, during a given period of time t1 (first time) after the start of the fuel cell 20, the radiator fan 26 is operated at a high speed regardless of the cooling water temperature under the control of the ECU 27. In the embodiment, the time t1 is shorter than the time t0 (second time) after which normal controlling of the radiator fan 26 based on the cooling water temperature is started, and the radiator fan 26 is operated at the maximum rotation speed Rm within the speed control range during the time t1 after the start of the fuel cell 20.

When the fuel cell 20 is started after an interval of time in hours or days, anode purge is carried out because hydrogen concentration in the anode is then low due to the diffusion of nitrogen from cathode to anode and the efficiency of electric power generation of the fuel cell 20 is low, accordingly. Specifically, the purge valve 35 is opened and closed intermittently under the control of the ECU 27 so that hydrogen gas is sufficiently supplied to the anode and water and nitrogen collected at the anode is discharged with the hydrogen gas into the purge gas pipe 34. In the anode purge during the time t1 after the start of the fuel cell 20, as shown in FIG. 3, the purge valve 35 is operated so that opening of the purge valve 35 for time t3 and closing of the purge valve 35 for time t4 are repeated alternately.

As shown in FIG. 3, hydrogen concentration in the anode is increased gradually from low to high by the above intermittent operation of the purge valve 35. In the drawing, the symbol t2 denotes the time it takes for the hydrogen concentration in the anode to increase from low to high. The efficiency of electric power generation of the fuel cell 20 is increased as the hydrogen concentration in the anode is increased. When the hydrogen concentration in the anode is high, the efficiency of electric power generation of the fuel cell 20 is the highest and the output of the fuel cell 20 is the highest. As shown in FIG. 3, the electric power generation by the fuel cell 20 becomes the maximum when the time t2 has elapsed after the fuel cell 20 is started, which allows electric power supply to almost all of the loads of the forklift truck. When the time t4 in the anode purge becomes shorter, that is, when the duty ratio (t3/t4) of the operation of the purge valve 35 becomes larger, the hydrogen concentration in the anode reaches high level rapidly, which shortens the time t2 it takes for the output of the fuel cell 20 to reach the maximum. In the present embodiment, the time t1 is substantially equal to the time t2.

On the other hand, the anode purge gas discharged into the purge gas pipe 34 is supplied to the diluter 24, diluted with the cathode off-gas from the exhaust pipe 32, and then discharged through the exhaust pipe 36 out of the casing 11 as exhaust gas. In this case, airflow produced by the radiator fan 26 and flowed through the radiator 25 is guided by the tapered end 40A of the guide pipe 40 and directed toward the outlet 40B in the guide pipe 40. The airflow delivered out of the guide pipe 40 is blown against the exhaust gas discharged out of the exhaust pipe 36 that is located adjacent to the outlet 40B of the guide pipe 40, so that the exhaust gas is forcedly diffused into the atmosphere.

During the time t1 after the start of the fuel cell 20, the radiator fan 26 is operated at the maximum rotation speed Rm, and the flow rate of air blown against the exhaust gas is the highest, accordingly. This allows the exhaust gas to be diffused forcedly by such increased air flow rate and also the hydrogen concentration in the exhaust gas to be decreased below a predetermined level (e.g., 2% or less in UL standard), even in a condition that hydrogen concentration in the exhaust gas discharged from the exhaust pipe 36 is high. Thus, the time it takes for the hydrogen concentration in the anode to become high, that is, the time t2 it takes for the fuel cell output to become the maximum can be shortened by increasing the duty ratio of the operation of the purge valve 35 so as to increase frequency of the anode purge.

Electric power generation by the fuel cell 20 is started concurrently with the start of the fuel cell 20. Fuel cell temperature is gradually increased due to the heat produced with the electric power generation. The fuel cell 20 has an appropriate temperature at which the efficiency of electric power generation is the highest. To prevent excessive increase of the temperature of the fuel cell 20 and thereby to maintain the fuel cell 20 at the appropriate temperature, cooling water is circulated between the radiator 25 and the fuel cell 20 through the heat medium passage 37 so that the heat generated in the fuel cell 20 is transferred to the radiator 25 and radiated from the radiator fins into the atmosphere. Such heat radiation from the fuel cell 20 depends on the flow rate of cooling water circulating through the heat medium passage 37 and also on the rotation speed of the radiator fan 26. The higher the flow rate of cooling water and the rotation speed of the radiator fan 26 become, the larger the mount of heat radiation becomes.

As shown in FIG. 3, after the fuel cell 20 is started, the temperature of the cooling water circulating through the heat medium passage 37 is gradually increased as the time elapses. In the present embodiment, during the time t1 after the start of the fuel cell 20, the circulation pump 38 is operated under the control of the ECU 27 so that the flow rate of the cooling water circulating through the heat medium passage 37 is lower than a flow rate when the hydrogen concentration in the anode is high, the efficiency of electric power generation of the fuel cell 20 is the highest and the output of the fuel cell 20 is maximum. Specifically, during the time t1 after the start of the fuel cell 20, the radiator fan 26 and the circulation pump 38 are controlled by the ECU 27 so that the radiator fan 26 is operated at the maximum speed Rm and the flow rate of the cooling water circulating through the heat medium passage 37 is at a level that is enough to reduce the localized concentration of the heat generated in the fuel cell 20. Thus, during the time t1 after the start of the fuel cell 20, the radiator fan 26 is operated at the maximum rotation speed Rm while the flow rate of the cooling water circulating through the heat medium passage 37 is low, which prevents excessive cooling of the fuel cell 20 and also prevents reduced efficiency of electric power generation due to a decrease of the fuel cell temperature at the start of the fuel cell 20. As a result, it takes less time for the fuel cell 20 to reach an appropriate temperature range in which the electric power generation is performed with a high efficiency.

As shown in FIG. 3, after the time 11 has elapsed, the radiator fan 26 is stopped, and the rotation speed of the circulation pump 38 is increased so that the flow rate of cooling water is changed from low to middle. The circulation of cooling water at the middle flow rate is continued until the time t0 has elapsed, and the cooling water temperature, which is detected by the temperature sensor 39 located outside the fuel cell 20, is increased approximately linearly by the circulation of cooling water at the low and middle flow rate. When the time t0 has elapsed and the cooling water temperature reaches a given cooling starting temperature T1, controlling of the radiator fan 26 based on the cooling water temperature is started, and the radiator 25 then performs its normal radiating function so as to prevent an increase of the cooling water temperature. After the time t0 has elapsed, the flow rate of cooling water is increased gradually as the cooling water temperature is increased. The rotation speed of the radiator fan 26 is controlled based on the previously programmed relation between the cooling water temperature and the rotation speed of the radiator fan 26. This allows the fuel cell 20 to operate in an appropriate temperature range in which electric power generation is done with the highest efficiency.

FIG. 4 shows graphs as an example for comparison with the embodiment of the present invention. In the case of FIG. 4, the high-speed operation of the radiator fan 26 and the circulation of the cooling water through the heat medium passage 37 at low flow rate as in the case of FIG. 3 are not performed. During the time t0 after the start of the fuel cell, the radiator fan 26 is at a stop. When the time t0 has elapsed and the cooling water temperature reaches the cooling starting temperature T1, controlling of the radiator fan 26 based on the cooling water temperature is started. In this case, the cooling water is circulated at middle flow rate until the time t0 elapses after the start of the fuel cell. After the time t0 has elapsed, the flow rate of cooling water is gradually increased as the cooling water temperature is increased.

During the time t0 after the start of the fuel cell 20, the radiator fan 26 is at a stop, and the amount of airflow blown against the exhaust gas discharged from the exhaust pipe 36 is approximately zero, accordingly. This makes it impossible to diffuse the exhaust gas forcedly by airflow and also to decrease the hydrogen concentration in the exhaust gas below a predetermined desired level (e.g. 2% or less in UL standard) in a condition that hydrogen concentration in the exhaust gas from the exhaust pipe 36 is high. Thus, as shown in FIG. 4, the valve closing time t4 of the purge valve 35 needs to be increased, that is, the duty ratio of the operation of the purge valve 35 needs to be decreased. This increases the time it takes for the hydrogen concentration in the anode to becomes high, resulting in increased time t5 it takes for the fuel cell output to become the maximum.

As described above, in the fuel cell system 12 according to the embodiment of the present invention, the operation of the radiator fan 36 and the circulation pump 38 is controlled during the time t1 after the start of the fuel cell 20 so that the radiator fan 26 is operated at the maximum rotation speed Rm and the flow rate of cooling water circulating through the heat medium passage 37 is low. This allows shortening of the time it takes for the fuel cell output to become the maximum while preventing temperature drop at the start of the fuel cell.

The fuel cell system 12 according to the first embodiment offers the following advantages.

(1) During the time t1 after the start of the fuel cell 20, the radiator fan 26 is operated at the maximum rotation speed Rm, and the flow rate of air blown against the exhaust gas is the highest, accordingly. This allows the exhaust gas to be diffused forcedly by such increased airflow rate and also the hydrogen concentration in the exhaust gas to be decreased below a predetermined level, even in a condition that hydrogen concentration in the exhaust gas discharged from the exhaust pipe 36 is high. Thus, the time it takes for the hydrogen concentration in the anode to become high, that is, the time t2 it takes for the fuel cell output to become the maximum can be shortened.

(2). The operation of the circulation pump 38 is controlled during the time t1 after the start of the fuel cell 20 so that the flow rate of cooling water circulating through the heat medium passage 37 is low. Thus, during the time t1 after the start of the fuel cell 20, the radiator fan 26 is operated at the maximum rotation speed Rm while the flow rate of the cooling water circulating through the heat medium passage 37 is low, which prevents excessive cooling of the fuel cell 20 and also prevents reduced efficiency of electric power generation due to a decrease of the fuel cell temperature at the start of the fuel cell 20. As a result, it takes less time for the fuel cell 20 to reach an appropriate temperature range in which the electric power generation is performed with a high efficiency, and the time t2 it takes for the fuel cell output to become the maximum can be shortened further.

(3) The time t1 is shorter than the time t0 after which controlling of the radiator fan 26 based on the cooling water temperature for maintaining the fuel cell 20 at the appropriate temperature is started. Thus, it is only necessary to operate the radiator fan 26 at a high speed using the time during which the radiator fan is at a stop in a conventional fuel cell system. Such operation of the radiator fan 26 can be accomplished only by a minimum system modification such as a minor change to the program in the ECU 27 of the fuel cell system 12.

(4) Anode purge gas from the fuel cell 20 is diluted in the diluter 24 before being discharged from the exhaust pipe 36, which reliably decreases hydrogen concentration in the exhaust gas below a predetermined level.

(5) The forklift truck 10 equipped with the fuel cell system 12 of the present embodiment prevents accumulation of anode purge gas in a work area such as warehouse where the forklift truck 10 is used.

The above embodiment may be modified in various ways as exemplified below.

Although in the previous embodiment the radiator fan 26 is operated at the maximum rotation speed Rm during the time t1, the rotation speed during the time t1 may be 50% or more of the maximum rotation speed Rm.

Although in the previous embodiment the circulation pump 38 is operated so that the flow rate of cooling water is low during the time t1 after the start of the fuel cell, the circulation pump 38 may be at a stop so that the flow rate is approximately zero. This further prevents a temperature drop of the fuel cell at its start, thus allowing further shortening of the time it takes for the fuel cell output to become the maximum.

Although in the previous embodiment anode purge gas is diluted in the diluter 24 before being discharged into the atmosphere, the anode purge gas may be discharged through the purge gas pipe 34 directly into the atmosphere without being diluted. In such a case, it is so arranged that the outlet of the purge gas pipe 34 as the exhaust pipe is located adjacent to the outlet 40B of the guide pipe 40.

In the previous embodiment, airflow from the radiator fan 26 through the guide pipe 40 is blown against the anode purge gas (exhaust gas) discharged from the exhaust pipe 36. Alternatively, it may be so arranged that the anode purge gas discharged from the exhaust pipe 36 is blown against the airflow from the radiator fan 26 through the guide pipe 40.

In the previous embodiment, the radiator fan 26 is located between the fuel cell 20 and the radiator 25. The radiator fan 26 may be located anywhere as long as the radiator fan 26 functions to increase the flow rate of air through the radiator 25. For example, the radiator fan 26 may be located on the opposite side of the fuel cell 20 from the radiator 25, or on the opposite side of the radiator 25 from the fuel cell 20.

The radiator fan 26 may be used not only for cooling the radiator 25 but also for cooling other components in the fuel cell system 12.

In the previous embodiment, the airflow from the radiator fan 26 through the radiator 25 is guided by the guide pipe 40 and blown against the anode purge gas discharged from the exhaust pipe 36. Alternatively, it may be so arranged that part of the airflow from the radiator fan 26 which has not passed through the radiator 25 is guided by the guide pipe 40 and blown against the anode purge gas discharged from the exhaust pipe 36.

Figure 5:
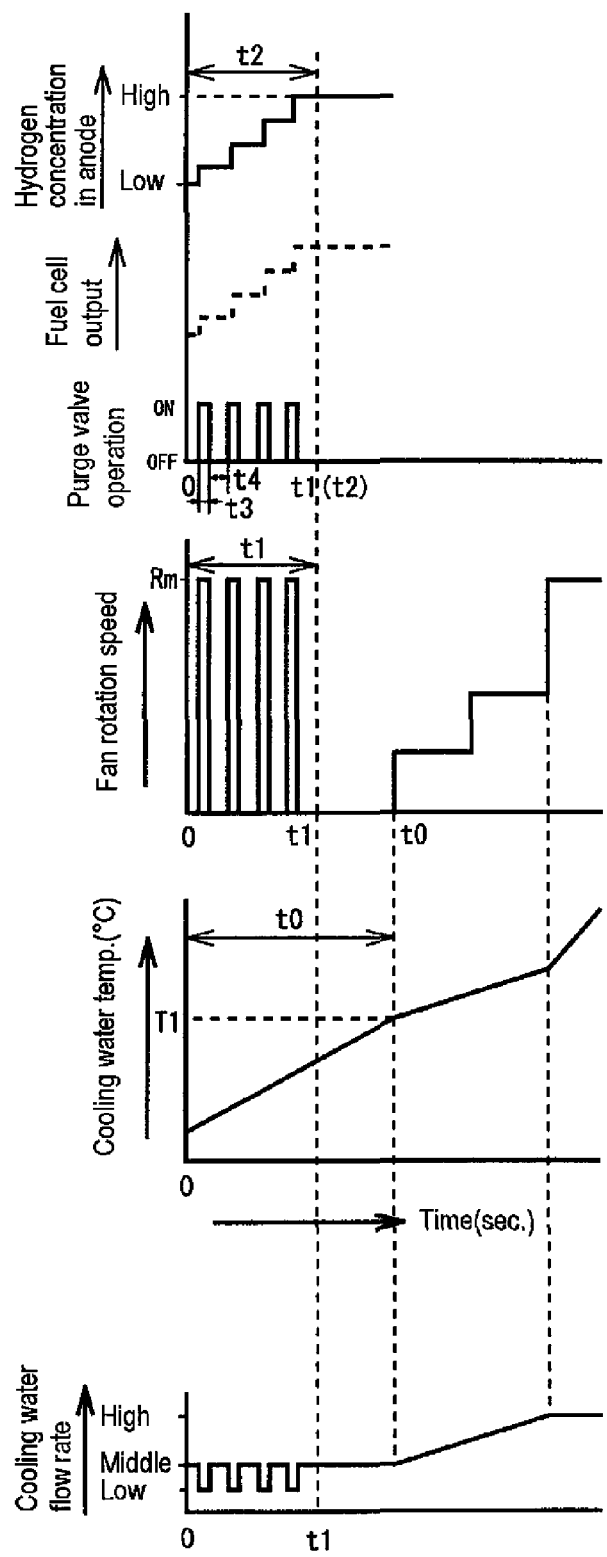
FIG. 5 shows graphs explaining the operation of a fuel cell system according to another embodiment of the present invention.

In the previous embodiment, the radiator fan 26 is operated at the maximum rotation speed Rm and the circulation pump 38 is operated at low flow rate during the time t1 after the start of the fuel cell. Alternatively, it may be so controlled that the operation of the radiator fan 26 at the maximum rotation speed Rm and the operation of the circulation pump 38 at low flow rate is performed in synchronization with the anode purge operation. Specifically, as shown in FIG. 5, the radiator fan 26 may be operated at the maximum rotation speed Rm during the valve opening time t3 of the purge valve 35, and the radiator fan 26 may be kept at a stop during the valve closing time t4 of the purge valve 35. The circulation pump 38 may be operated at low flow rate during the valve opening time t3 and operated at middle flow rate during the valve closing time t4.

The present invention may be applied not only to a forklift truck but also to other types of industrial vehicles such as a construction vehicle and a towing tractor, or to general-purpose vehicles such as a passenger car and a bus.

In the present embodiment, the operation of the radiator fan 26 at high speed and the operation of the circulation pump 38 at low flow rate are performed in synchronization with the anode purge operation at the start of the fuel cell. Alternatively, such operation of the radiator fan 26 and the circulation pump 38 may be performed in synchronization with the anode purge operation while the fuel cell is in operation.

What is claimed is:

1. A fuel cell system for generating electric power through a reaction between oxygen supplied to a cathode and hydrogen supplied to an anode of a fuel cell, comprising:
   an exhaust pipe through which anode purge gas from the fuel cell is discharged into the atmosphere;
   a heat medium passage through which heat medium is flowed, the heat medium passage being thermally coupled to the fuel cell;
   a circulation pump for circulating the heat medium through the heat medium passage;
   a heat exchanger provided in the heat medium passage;
   a heat exchanger fan for generating airflow through the heat exchanger;
   a guide by which the airflow is guided so as to diffuse the anode purge gas discharged from the exhaust pipe;
   a purge valve through which anode purge gas from the fuel cell is discharged; and
   a controller programmed to control the operation of the circulation pump and the heat exchanger fan,
   wherein the controller is programmed to open and close the purge valve intermittently during the control of the anode purge, and
   wherein the controller is programmed to operate the circulation pump and the heat exchanger fan during the anode purge for a first time after the start of the fuel cell in such a way that the heat exchanger fan is operated regardless of the heat medium temperature, and a flow rate of the heat medium flowing through the heat medium passage is zero or lower than a flow rate when output of the fuel cell is maximum, while the purge valve is intermittently opened.

2. The fuel cell system according to claim 1, wherein the heat exchanger fan is operated during the anode purge at the maximum rotation speed within its speed control range.

3. The fuel cell system according to claim 1, further comprising a diluter for diluting anode purge gas from the fuel cell with cathode off-gas from the cathode of the fuel cell.

4. The fuel cell system according to claim 3, wherein the first time is shorter than a second time after which controlling of the heat exchanger fan based on the heat medium temperature is started.

* * * * *